United States Patent
Jung

(10) Patent No.: US 7,697,943 B2
(45) Date of Patent: Apr. 13, 2010

(54) MOBILE COMMUNICATION TERMINAL CAPABLE OF VARYING SETTINGS OF VARIOUS ITEMS IN A USER MENU DEPENDING ON A LOCATION THEREOF AND A METHOD THEREFOR

(75) Inventor: Sung-Kwon Jung, Gunpo-si (KR)

(73) Assignee: Samsung Electronics Co., Ltd (KR)

( * ) Notice: Subject to any disclaimer, the term of this patent is extended or adjusted under 35 U.S.C. 154(b) by 62 days.

(21) Appl. No.: 10/909,883

(22) Filed: Aug. 2, 2004

(65) Prior Publication Data
US 2005/0048989 A1 Mar. 3, 2005

(30) Foreign Application Priority Data
Aug. 29, 2003 (KR) ...................... 10-2003-0060428

(51) Int. Cl.
*H04W 24/00* (2006.01)
(52) U.S. Cl. .............. 455/456.3; 455/404.2; 455/414.2; 455/418; 455/456.1; 455/456.2; 455/456.5; 455/456.6; 455/457; 455/567
(58) Field of Classification Search .............. 455/404.2, 455/414.2, 418, 456–457, 567, 569.1, 574
See application file for complete search history.

(56) References Cited

U.S. PATENT DOCUMENTS

| 5,799,256 | A | * | 8/1998 | Pombo et al. ................ 455/574 |
| 5,809,414 | A | * | 9/1998 | Coverdale et al. ........... 455/421 |
| 5,966,655 | A | * | 10/1999 | Hardouin .................... 455/418 |
| 6,078,826 | A | * | 6/2000 | Croft et al. .................. 455/574 |
| 6,195,572 | B1 |  | 2/2001 | Patterson et al. |
| 6,408,187 | B1 |  | 6/2002 | Merriam |
| 6,954,657 | B2 | * | 10/2005 | Bork et al. ................... 455/567 |
| 6,973,301 | B1 | * | 12/2005 | Contino et al. .............. 455/419 |
| 6,975,874 | B1 | * | 12/2005 | Bates et al. ............... 455/456.6 |
| 2001/0053709 | A1 | * | 12/2001 | Terasaka ..................... 455/567 |
| 2002/0076033 | A1 |  | 6/2002 | Baweja et al. |
| 2002/0082774 | A1 |  | 6/2002 | Bloebaum |
| 2002/0119788 | A1 | * | 8/2002 | Parupudi et al. ............ 455/456 |
| 2002/0142792 | A1 |  | 10/2002 | Martinez |
| 2003/0017859 | A1 |  | 1/2003 | Martinez et al. |
| 2003/0054866 | A1 | * | 3/2003 | Byers et al. ................. 455/567 |

FOREIGN PATENT DOCUMENTS

| DE | 100 39 211 A1 | 8/2000 |
| GB | 2360914 | 10/2001 |
| KR | 1020010047664 A | 6/2001 |
| KR | 1020010090626 A | 10/2001 |
| KR | 1020030031295 A | 4/2003 |
| KR | 1020050015725 A | 2/2005 |

* cited by examiner

*Primary Examiner*—Stephen M D'Agosta
(74) *Attorney, Agent, or Firm*—The Farrell Law Firm, LLP

(57) ABSTRACT

A mobile communication terminal capable of varying settings of items in a user menu depending on a location of the mobile communication terminal. The mobile communication terminal has a location information storing unit for storing location information of the mobile communication terminal and places corresponding to the location information, a setting information storing unit for storing the settings of the items in the user menu corresponding to the places, and a control unit for varying previous settings of the items in the user menu with the settings of items corresponding to the location of the mobile communication terminal when the mobile communication terminal is located in a registered place.

7 Claims, 8 Drawing Sheets

| LOCATION INFORMATION | LOCATION |
|---|---|
| $(X_1, Y_1)$ | HOME |
| $(X_2, Y_2)$ | THEATER |
| $(X_3, Y_3)$ | CONFERENCE ROOM |
| $(X_4, Y_4)$ | PARK |

| ITEMS / LOCATION | RADIUS OF PLACE | TYPE OF BELL SOUND | LEVEL OF BELL SOUND | SCREEN BRIGHTNESS | LOCAL AREA CODE | RESTRICTION MODE FOR INCOMING /OUTGOING CALLS | MANNER MODE | BACKGROUND IMAGE | RESTRICTION MODE FOR INCOMING /OUTGOING SMS | TWO-NUMBER SERVICE | LOCKING MODE | ALARM SOUND |
|---|---|---|---|---|---|---|---|---|---|---|---|---|
| HOME | 10m~15m | RING A BELL FIVE TIMES | MINIMUM | 30% | 031 | RESTRICT OUTGOING CALL | - | PICTURE 1 | RESTRICT INCOMING SMS | Second Number | YES | EXERCISE TIME |
| THEATER | 15m~20m | SILENCE | - | 10% | 02 | - | - | PICTURE 2 | RESTRICT OUTGOING SMS | First Number | NO | - |
| CONFERENCE ROOM | 5m~10m | VIBRATION | - | 50% | 02 | - | YES | MOVING PICTURE 2 | - | First Number | YES | - |
| PARK | 40m~50m | VIBRATION AFTER GENERATING MELODY FIVE TIMES | MAXIMUM | 90% | 031 | - | - | - | - | Second Number | NO | TRAIN TIME |

| LOCATION | CONFERENCE ROOM |
|---|---|
| RADIUS OF PLACE | 5m~10m |
| TYPE OF BELL SOUND | SILENCE |
| LEVEL OF BELL SOUND | - |
| SCREEN BRIGHTNESS | 30% |
| RESTRICTION MODE FOR INCOMING/OUTGOING CALLS | - |
| MANNER MODE | - |
| BACKGROUND IMAGE | PICTURE 1 |
| LOCAL AREA CODE | 02 |

FIG.4C

| LOCATION | COMPANY |
|---|---|
| RADIUS OF PLACE | 10m~15m |
| TYPE OF BELL SOUND | BELL 3 |
| LEVEL OF BELL SOUND |  |
| SCREEN BRIGHTNESS | 30% |
| RESTRICTION MODE FOR INCOMING/OUTGOING CALLS | - |
| MANNER MODE | - |
| BACKGROUND IMAGE | PICTURE 2 |
| LOCAL AREA CODE | 02 |

FIG.4D

MOBILE COMMUNICATION TERMINAL CAPABLE OF VARYING SETTINGS OF VARIOUS ITEMS IN A USER MENU DEPENDING ON A LOCATION THEREOF AND A METHOD THEREFOR

PRIORITY

This application claims priority to an application entitled "Mobile Communication Terminal Capable of Varying Set Points of Various Items in User's Menu Depending on Location Thereof and Method Therefor" filed in the Korean Intellectual Property Office on Aug. 29, 2003 and assigned Serial No. 2003-60428, the contents of which are hereby incorporated by reference.

BACKGROUND OF THE INVENTION

1. Field of the Invention

The present invention relates generally to a mobile communication terminal, and more particularly to a mobile communication terminal capable of varying settings of various items in a user menu depending on a location thereof, and a method therefor.

2. Description of the Related Art

Generally, mobile communication terminals are electronic devices, such as cellular phones or personal digital assistants (PDA), capable of allowing a user on the move to transmit/receive data or to communicate with other users. As telecommunication technologies make great strides, such mobile communication terminals are being provided with a user menu having various items to enable users to set a type of bell sound, a level of bell sound, a type of a background image, an alarm sound, a locking mode, and a restriction mode for incoming/outgoing calls. That is, users can variously set the items of the user menu including these menu functions as required by the users. These settings of such items of the user menu will remain unchanged until the users change the settings of items again. For example, if a user sets the level of bell sound to a maximum level, the maximum bell sound level is constantly maintained even if a place of the user having a mobile communication terminal is shifted from a noisy spot into a quiet spot. Therefore, the user must reset the setting of the bell sound level to a minimum level if the location of the mobile communication terminal is shifted from the noisy spot into the quiet spot, which causes inconvenience for the user.

Such inconveniences may be solved if a user stores various settings of the bell sound level in advance with respect to various places, such as a school, a home, and a park, in such a manner that the bell sound level is automatically varied according to the location of the mobile communication terminal. That is, it is convenient for the user to previously store the various settings with respect to the various items of the user menu corresponding to the various location of the mobile communication terminal in such a manner that the settings of the items are automatically changed depending on the location of the mobile communication terminal.

SUMMARY OF THE INVENTION

Accordingly, the present invention has been designed to solve the above and other problems occurring in the prior art, and an object of the present invention is to provide a mobile communication terminal capable of setting and storing various settings with respect to various items in a user menu, and a method therefor.

Another object of the present invention is to provide a mobile communication terminal capable of varying settings of various items in a user menu to predetermined settings stored in advance depending on a place thereof, which is determined by using a GPS signal, and a method therefor.

In order to accomplish the above and other objects, there is provided a mobile communication terminal capable of varying settings of items in a user menu depending on a location of the mobile communication terminal. The mobile communication terminal comprises: a location information storing unit for storing location information of the mobile communication terminal and places corresponding to location information; a setting information storing unit for storing the settings of items in the user menu corresponding to the places; a program storing unit for storing a program, which varies the settings of items in the user menu depending on the location of the mobile communication terminal; and a control unit for storing location information of the mobile communication terminal and a location of the mobile communication terminal input by a user through comparing location information with the location of the mobile communication terminal when the user requests a place registration. The control unit stores settings of items in the user menu selected by the user corresponding to the location of the mobile communication terminal, and varies previous settings of items in the user menu with the settings of items corresponding to the location of the mobile communication terminal when the mobile communication terminal is located in a registered place.

Further, according to another aspect of the present invention, there is provided a method for varying settings of items in a user menu of a mobile communication terminal depending on a place of the mobile communication terminal. The method comprises the steps of: receiving location information of the mobile communication terminal; storing the location information of the mobile communication terminal and a place of the mobile communication terminal input by a user through comparing location information with the place of the mobile communication terminal when the user requests a place registration, and storing settings of items in the user menu selected by the user corresponding to the place of the mobile communication terminal; and varying previous settings of items in the user menu with the settings of items corresponding to the place of the mobile communication terminal when the mobile communication terminal is located in a registered place.

BRIEF DESCRIPTION OF THE DRAWINGS

The above and other objects, features, and advantages of the present invention will be more apparent from the following detailed description taken in conjunction with the accompanying drawings, in which:

FIG. 2 is a look-up table showing location information of a mobile communication terminal corresponding to various places according to an embodiment of the present invention;

FIG. 3 is a look-up table showing various settings of items in a user menu corresponding to various places according to an embodiment of the present invention;

FIGS. 4A to 4E illustrate user menu images for registering locations and storing settings of items corresponding to the locations by using a GPS signal according to an embodiment of the present invention;

DETAILED DESCRIPTION OF THE PREFERRED EMBODIMENT

Figure 1:
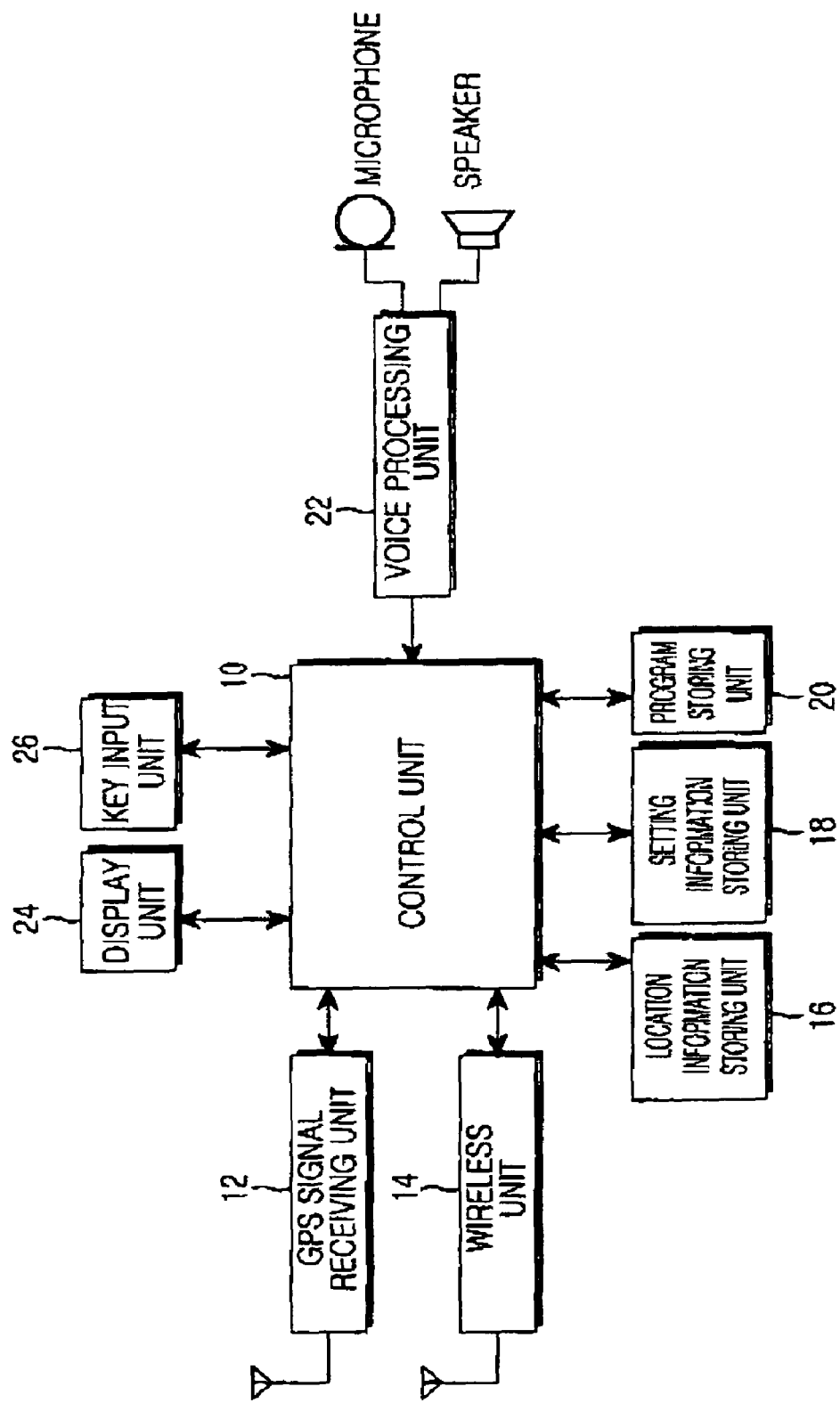
FIG. 1 is a block view of a mobile communication terminal according to an embodiment of the present invention.

Preferred embodiments of the present invention will be described in detail herein below with reference to the accompanying drawings. In the following description of the present invention, the same reference numerals are used to designate the same or similar components. It will be understood by those skilled in the art that the present invention is not limited to specific elements, such as circuit devices, described in the following description. Further, a detailed description of known functions and configurations incorporated herein will be omitted when it may make the subject matter of the present invention rather unclear.

The present invention provides a mobile communication terminal capable of automatically varying settings of items in a user menu to predetermined settings according to a location of the mobile communication terminal.

According to a preferred embodiment of the present invention, the items included in a user menu include a type of bell sound, a level of bell sound, screen brightness, a local area code, a restriction mode for incoming/outgoing calls, a manner mode, a background image, a restriction mode for incoming/outgoing SMS, a two-number service, a locking mode, and an alarm sound, which can be varied by the user. In addition, the items of the user menu have various settings, respectively, so that the user can set the items with a predetermined setting. For example, the type of bell sound includes settings of "silence", "bell 1", "bell 2", and "bell 3", so the user can select the type of bell sound from options. In addition, screen brightness includes settings of "30%", "50%", "70%", and "100%", so the user can select screen brightness from these options. While in the preferred embodiment of the present invention, the above-described items are included in the user menu, it should be appreciated by those skilled in the art that these are merely used as an example and that there are many other possible items that may be included in the user menu.

Hereinafter, a mobile communication terminal capable of automatically varying the setting of items to a predetermined setting depending on the location of the mobile communication terminal will be described in detail with reference to FIG. 1, which is a block view of the mobile communication terminal according to an embodiment of the present invention. Referring to FIG. 1, the mobile communication terminal of the present invention includes a control unit 10, a GPS signal receiving unit 12, a wireless unit 14, a place information storing unit 16, a setting information storing unit 18, a program storing unit 20, a voice processing unit 22, a display unit 24, and a key input unit 26.

The control unit 10 controls an operation of the mobile communication terminal required for varying the settings of items to the predetermined settings according to the location of the mobile communication terminal. More specifically, the control unit 10 analyzes a received GPS signal so as to detect location information of the mobile communication terminal, registers the place by using location information, and stores the setting corresponding to the registered place of the mobile communication terminal. In addition, the control unit 10 automatically varies the settings of the items to the stored settings when the mobile communication terminal is positioned in the registered place.

The GPS signal receiving unit 12 receives the GPS signal from a GPS through an antenna and transmits the GPS signal to the control unit 10. The wireless unit 14 receives/transmits voice data and control data under the control of the control unit 10. The voice processing unit 18 modulates an electric signal, which is input from a microphone, in order to convert the electric signal into voice data, and demodulates coded voice data, which is input from the wireless unit 14, into an electric signal thereby outputting the electric signal through a speaker. The speaker converts the electric signal into audible sounds.

The place information storing unit 16 stores location information and places corresponding to location information in a look-up table. FIG. 2 is a look-up table showing places of the mobile communication terminal corresponding to location information according to an embodiment of the present invention. Referring to FIG. 2, location information of the mobile communication terminal calculated based on the GPS signal and locations of the mobile communication terminal corresponding to the place information are stored in the place information storing unit 16. The location information calculated based on the GPS signal includes a latitude coordinate and a longitude coordinate, such as $(X_1, Y_1)$, $(X_2, Y_2)$, $(X_3, Y_3)$, and $(X_4, Y_4)$. The places corresponding to the location information include, for example, a home, a theater, a conference room, and a park. The location information and the places corresponding to the location information are previously registered and stored in a place information table through an interface, such as a touch panel, a key pad, etc.

The setting storing unit 18 stores settings of each item corresponding to the places. FIG. 3 is a look-up table showing various settings of items in the user menu corresponding to various places according to an embodiment of the present invention. Referring to FIG. 3, the items of the look-up table include a radius of a place where the mobile communication terminal is located, a type of bell sound, a level of bell sound, screen brightness, a local area code, a restriction mode for incoming/outgoing calls, a manner mode, a background image, a restriction mode for incoming/outgoing SMS, a two-number service, a locking mode, and an alarm sound. For example, when the mobile communication terminal is located in the home, the setting storing unit 18 stores settings of the items of the user menu as follows: "radius of place: 10 to 15 m, type of bell sound: ring a bell five times, level of bell sound: minimum, screen brightness: 30%, local area code: 031, restriction mode for incoming/outgoing calls: yes, manner mode: no, background image: picture 1, restriction mode for incoming/outgoing SMS: yes, two-number service: second number, locking mode: yes, and alarm sound: exercising time.

The program storing unit 20 temporarily stores programs processed in the control unit 10 or transmits stored programs to the control unit 10. The program storing unit 20 stores programs required for varying settings of the items to the stored settings depending on the places.

The place information storing unit 16, the setting storing unit 18, and the program storing unit 20 may include a ROM, an EEPROM and a RAM.

The display unit 24 includes an LCD for displaying various data created from the mobile communication terminal. The display unit 24 displays an image required for registering a place and stores settings of the items corresponding to the registered place.

The key input unit 26 is an interface between the mobile communication terminal and the user. The key input unit 26 has various functions keys, number keys, and special keys.

The key input unit 26 outputs a key input signal as the user operates the key input unit 26.

According to the mobile communication terminal of the present invention, location information of the mobile communication terminal is calculated based on the GPS signal as a place registration is requested by the user. Then, a place corresponding to the location information and settings of items corresponding to the place are stored in the mobile communication terminal. The mobile communication terminal also has a place registration menu for storing settings of the items along with location information and the place corresponding to location information.

FIGS. 4A to 4E illustrate user menu images for registering places of the mobile communication terminal and storing settings of items corresponding to the locations corresponding to location information of the mobile communication terminal by using a GPS signal according to an embodiment of the present invention.

Figure 4A:
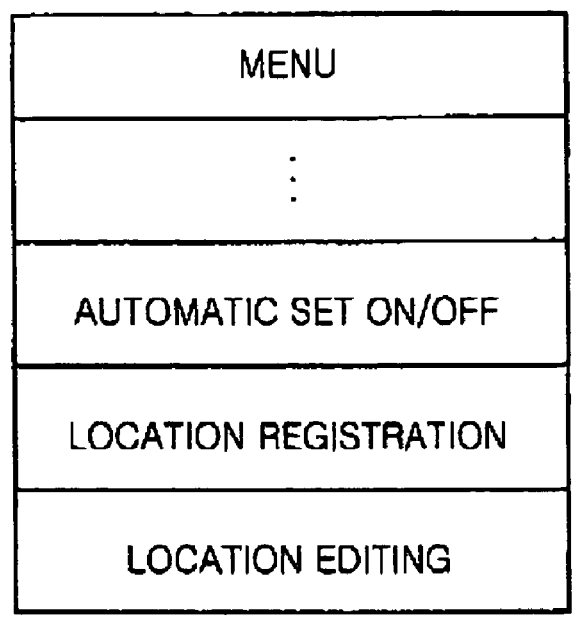

More specifically, FIG. 4A illustrates a menu image of the mobile communication terminal according to an embodiment of the present invention. The menu image includes an on/off menu, a place registration menu, and a place editing menu.

Referring to FIG. 4A, the on/off menu is used for automatically varying the settings of the items depending on the place. When the user selects an "on mode" from the on/off menu, the mobile communication terminal automatically varies the settings of the items to the predetermined settings, which are stored in the mobile communication terminal in advance, according to the place. However, if the user selects an "off mode" from the on/off menu, the settings of the items in the user menu are maintained regardless of the location of the mobile communication terminal.

The place registration menu illustrated in FIG. 4A is used for storing the places corresponding to location information of the mobile communication terminal and the settings of the items according to the places. When the user selects the place registration menu, a place registration image is displaced in a screen of the mobile communication terminal as illustrated in FIG. 4B.

Figure 4B:
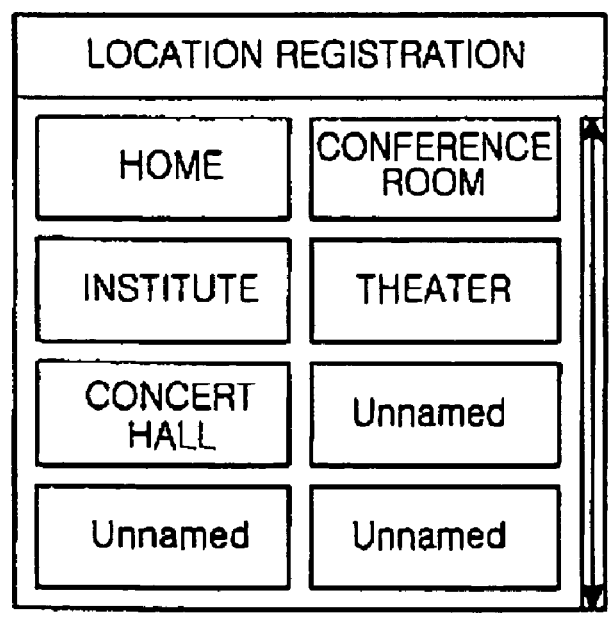

Referring to FIG. 4B, the place registration image includes various icons, for example, representing a home, a conference room, an institute, a theater, a concert hall, and unnamed places. The icons representing the home, the conference room, the institute, the theater, and the concert hall are previously registered icons. In addition, the user can register new places of the mobile communication terminal by using the unnamed icons. For example, if the user selects an icon representing the conference room from the registration image, the mobile communication terminal displays settings of items in the user menu corresponding to the conference room as illustrated in FIG. 4C. The settings of items in the user menu corresponding to the conference room are as follows: "place: conference room, radius of place: 5-10 m, sort of bell sound: silence, level of bell sound: none, screen brightness: 30%, restriction mode for incoming/outgoing calls: none, manner mode: none, background image: picture 1, and local area code: 02. In addition, the user can correct the settings of the items, such as the place, radius of place, type of bell sound, level of bell sound, and screen brightness.

For example, the user can correct the place from the conference room to a first conference room, and the screen brightness from 30% to 50%. In addition, if the user selects the unnamed icons from the place registration image illustrated in FIG. 4B in order to register new places of the mobile communication terminal, the mobile communication terminal displays a new place registration image for registering new places of the mobile communication terminal as illustrated in FIG. 4D. Thus, the user can input the new place of the mobile communication terminal in the new place registration image.

At this time, the user also selects the settings of the items, such as a radius of place, a type of bell sound, a level of bell sound, screen brightness, a restriction mode for incoming/outgoing calls, a manner mode, and a background image, corresponding to the new place. For example, the user can register a title "company" in the new place registration image as a new place of the mobile communication terminal with selecting settings of the items corresponding to the "company" such as a radius of place: 10-15 m and a background image: picture 2.

Figure 4E:
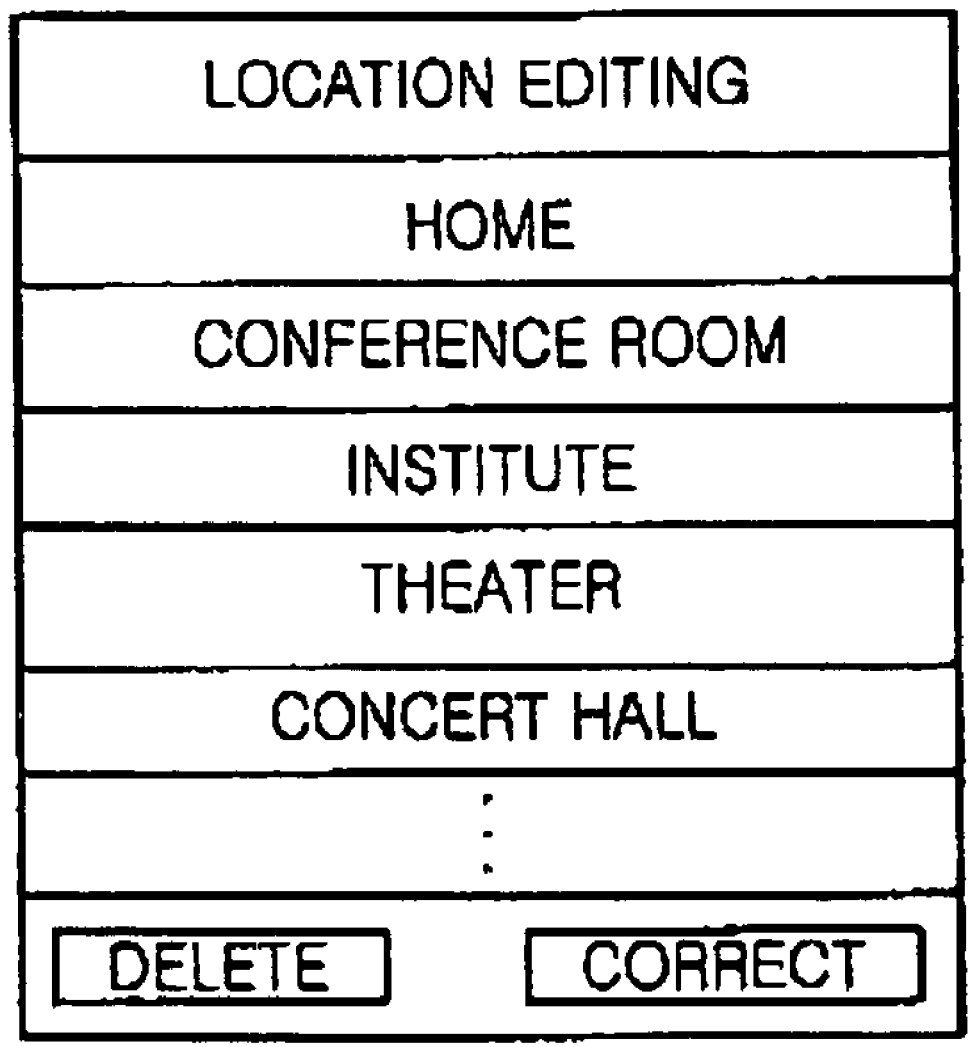

The place editing menu illustrated in FIG. 4A is used to delete or correct the previously registered places. If the user selects the place editing menu from the menu image shown in FIG. 4A, the mobile communication terminal displays a place editing image as illustrated in FIG. 4E. The place editing image has a list of the currently registered places. When deleting a place from the place editing image, the user firstly selects the place to be deleted from the list of places and deletes the place by operating a delete icon. In addition, the user can correct places contained in the list of places by operating a correcting icon. For example, if the user wants to correct the "conference room" registered in the list of the places displayed on the place editing image, the user selects the "conference room" and operates the correcting icon. At this time, the mobile communication terminal displays settings of items corresponding to the "conference room" as illustrated in FIG. 4C. In this state, the user corrects the settings of items, such as the place, the radius of place, the type of bell sound, the level of the bell sound, etc.

Figure 5:
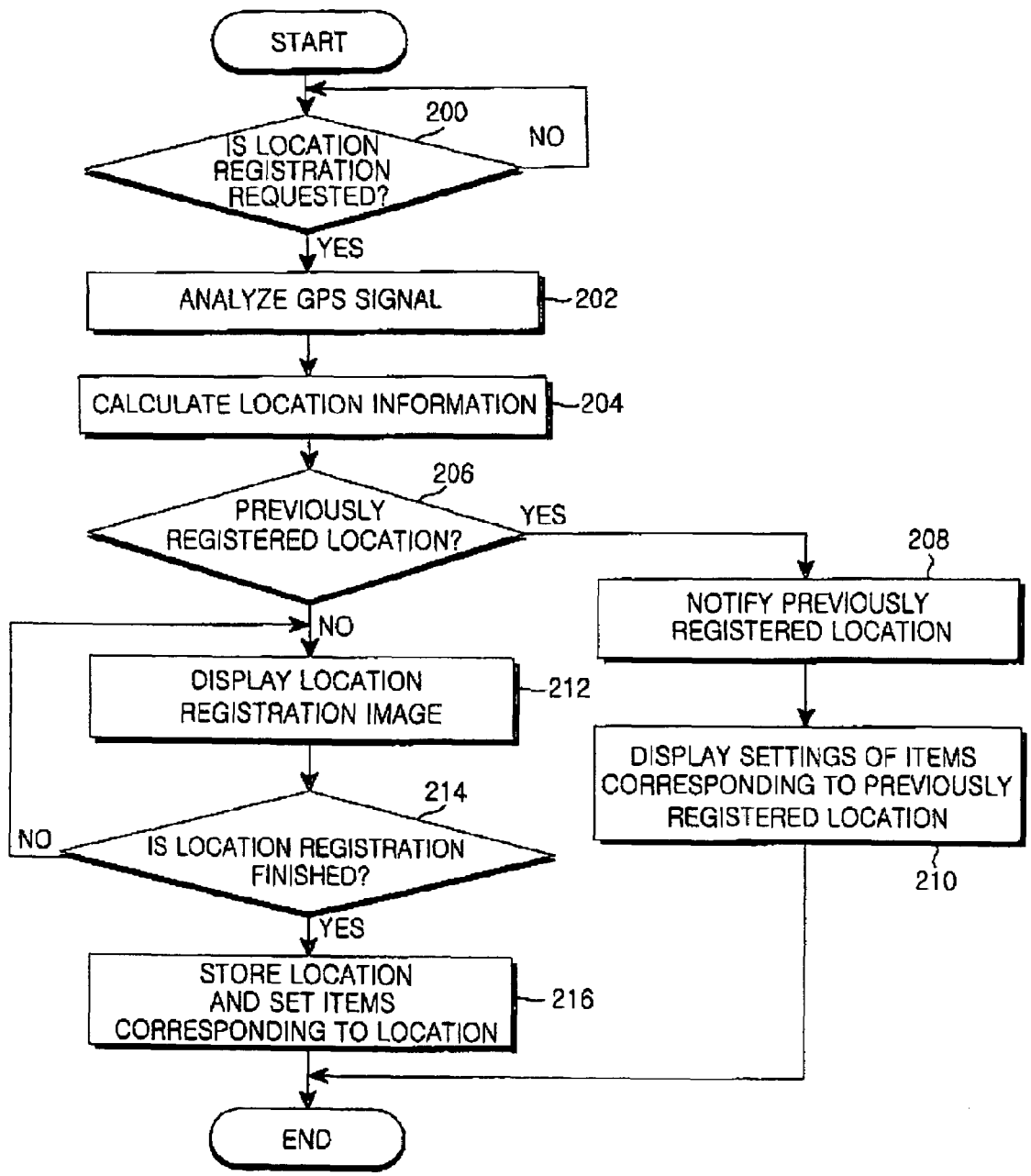
FIG. 5 is a flow chart illustrating a method for registering places by using a GPS signal according to an embodiment of the present invention.

FIG. 5 is a flow chart showing a method for registering places of a mobile communication terminal by using a GPS signal. Referring to FIG. 5, the control unit determines if a place registration is requested by the user in step 200. The user can request the place registration by selecting the unnamed icon from the place registration image illustrated in FIG. 4B after selecting the place registration menu from the menu image illustrated in FIG. 4A. If the place registration is requested by the user, the control unit 10 analyzes the GPS signal received in the GPS signal receiving unit 12 in step 202. Then, the control unit 10 detects a local position (present location) of the mobile communication terminal and calculates location information of the mobile communication terminal by using the analyzed GPS signal in step 204. For example, the location information of the mobile communication terminal can be obtained as latitude and longitude coordination values (X,Y) of the mobile communication terminal.

Next, the control unit 10 determines whether the location information of the mobile communication terminal matches with the previously registered places in step 206. That is, if the latitude and longitude coordination values (X, Y) of the mobile communication terminal match with coordination values stored in an information look-up table of the place information storing unit 16, the control unit 10 notifies that the mobile communication terminal is positioned in the previously registered place in step 208, and the control unit 10 displays the settings of the items of the user menus corresponding to the place in step 210. For example, if the mobile communication terminal is located in the conference room, the control unit 10 displays the settings of the items of the user menu in the display unit 24 corresponding to the conference room as illustrated in FIG. 4C.

At this time, the user can correct the settings of the items including the radius of place, the type of bell sound, the level of bell sound, screen brightness, the restriction mode for incoming/outgoing calls. etc.

However, if the latitude and longitude coordination values (X, Y) of the mobile communication terminal do not match with coordination values stored in the information look-up table of the place information storing unit 16, the control unit 10 determines that the present location of the mobile communication is different from the previously registered places in step 206. Thus, the control unit 10 displays an image in the display unit 24 in order to register the present place of the mobile communication terminal in step 212. That is, the control unit 10 displays the new place registration image as illustrated in FIG. 4.

Accordingly, the user can register a new place in the new place registration image while selecting settings of the items corresponding to the new place. For example, as described above, the user can register a "company" in the new place registration image as a new place with selecting settings of the items corresponding to the "company" such as a radius of place: 10-15 m and a background image: picture 2.

After displaying the new place registration image, the control unit 10 determines whether the settings of the items have been selected in step 214. If the settings of the items have been selected by the user, the control unit 10 stores location information corresponding to the new place in the place formation storing unit 16, and stores the settings of the items corresponding to the new place in the setting information storing unit 18 in step 216.

As described above, the mobile communication terminal according to the present invention stores the settings of items in the user menu corresponding to various places of the mobile communication terminal, and automatically varies the settings of items depending on the place. That is, when the mobile communication terminal of the present invention is located in a registered place, the settings of the items of the user menu, such as the type of bell sound and the level of the bell sound, are automatically varied corresponding to the registered place.

Figure 6:
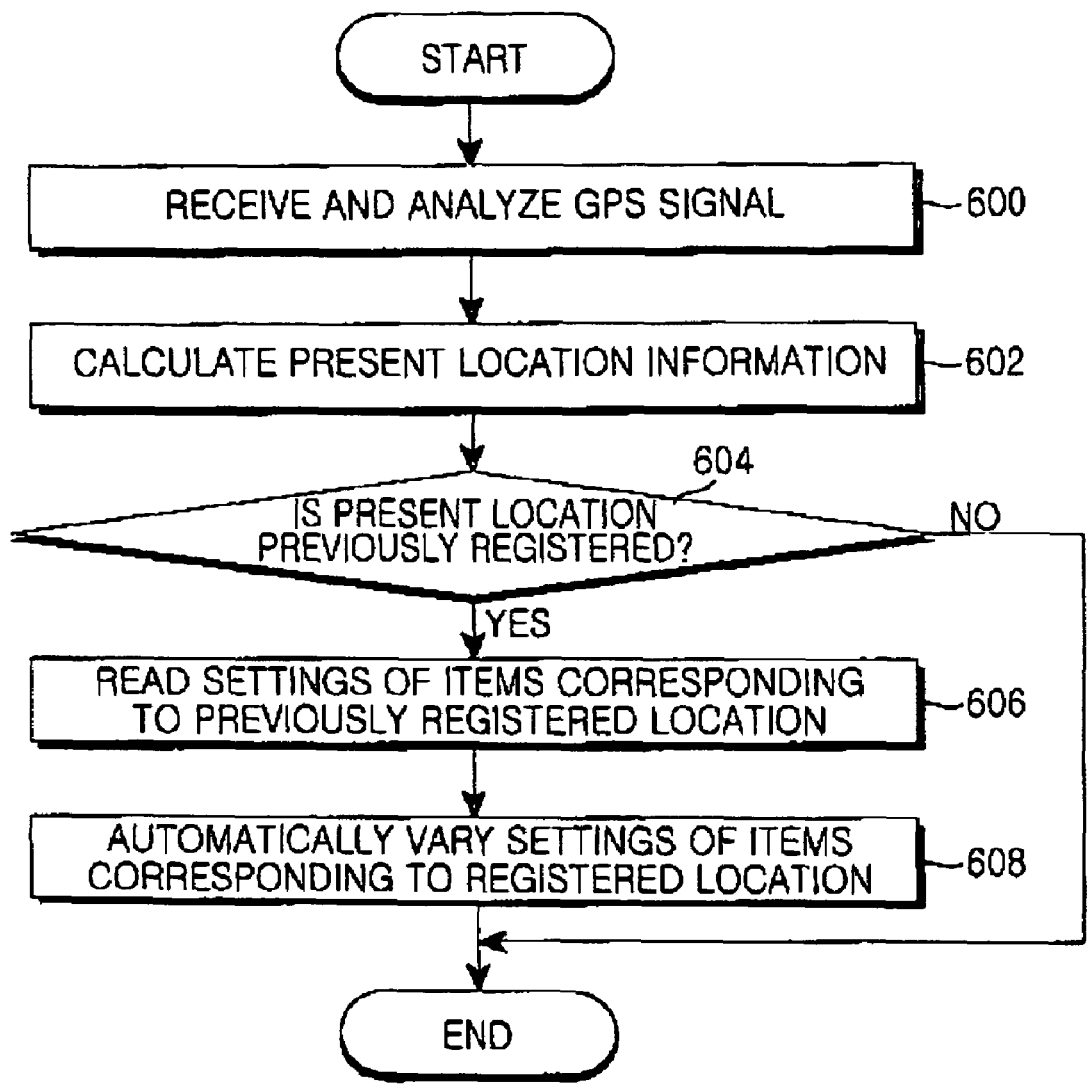
FIG. 6 is a flow chart illustrating a method for automatically varying settings of items depending on a location of a mobile communication terminal according to an embodiment of the present invention.

FIG. 6 is a flow chart illustrating a method for automatically varying settings of items depending on places according to an embodiment of the present invention. Referring to FIG. 6, the control unit 10 analyzes the GPS signal received in the GPS signal receiving unit 12 in step 600, and calculates present location information of the mobile communication terminal by using the analyzed GPS signal in step 602. As described above, the present location information of the mobile communication terminal can be obtained as latitude and longitude coordination values (X, Y) of the mobile communication terminal.

After calculating present location information of the mobile communication terminal, the control unit 10 determines whether the present location of the mobile communication terminal is one of previously registered places in step 604. That is, the control unit 10 determines whether the latitude and longitude coordination values (X, Y) of the mobile communication terminal match with coordination values stored in the information look-up table of the place information storing unit 16. If the latitude and longitude coordination values (X, Y) of the mobile communication terminal are different from the coordination values stored in the information look-up table of the place information storing unit 16, the control unit 10 determines that the present location of the mobile communication terminal is a non-registered location, and the process is ended.

However, if the latitude and longitude coordination values (X, Y) of the mobile communication terminal match with the coordination values stored in the information look-up table of the place information storing unit 16, the control unit 10 determines that the present location of the mobile communication terminal is a registered place, and control unit 10 reads in the settings of the items corresponding to the present location of the mobile communication terminal in step 606. For example, if the location of the mobile communication terminal is a "home", the control unit 10 reads in the settings of each item corresponding to the "home" from a setting information table as illustrated in FIG. 3.

After reading the settings of the items of the user menu in step 606, the control unit 10 automatically varies the previous settings of the items with predetermined settings corresponding to the location of the mobile communication terminal. That is, the settings of the items are changed to the predetermined settings by the control unit 10.

As described above, according to the present invention, location information of the mobile communication terminal is calculated by analyzing the GPS signal as the user requests the place registration. In addition, places corresponding to the location information of the mobile communication terminal and setting information corresponding to the place are stored in the mobile communication terminal. Thus, when the mobile communication terminal is shifted from one registered place to the other registered place, the settings of the items in the user menu are automatically varied depending on the place. That is, the mobile communication terminal of the present invention stores setting information corresponding to various places and automatically varies previous settings of the items with the stored settings corresponding to the registered place as the mobile communication terminal is shifted into the registered place. Therefore, a user is not required to manually vary the settings of items in the user menu when the mobile communication terminal is positioned in a place requiring the variation of the settings of the items.

While the present invention has been shown and described with reference to certain preferred embodiments thereof, it will be understood by those skilled in the art that various changes in form and details may be made therein without departing from the spirit and scope of the invention as defined by the appended claims. For example, although the present invention has been described with the items of the user menu including the radius of place, a type of bell sound, screen brightness, a local area code, a restriction mode for incoming/outgoing calls, a manner mode, a background image, a restriction mode for incoming/outgoing SMS, a two-number service, a locking mode, and an alarm, other items can be included to the user menu by the user.

In addition, although it is described that the mobile communication terminal calculates location information by using the GPS signal, the present invention is not limited to this aspect. According to another aspect of the present invention, the mobile communication terminal can directly receive location information from wireless environment, or can receive location information from a location information service system, such as a local based service.

What is claimed is:

1. A mobile communication terminal capable of varying settings of a plurality of items in a user menu depending on a location the mobile terminal, the mobile communication terminal comprising:
   a GPS signal receiving unit for receiving a GPS signal;
   a setting information storing unit for storing the settings of the plurality of items in the user menu corresponding to locations;

a places information storing unit for storing location information of the mobile communication terminal and places corresponding to the location information; and a control unit for calculating the location information of the mobile communication terminal by using the GPS signal received in the GPS signal receiving unit, determining whether one of the places corresponds to the calculated location information, and varying previous settings of the plurality of items in the user menu with the settings of the items corresponding to the location of the mobile communication terminal when one of the places corresponds to the calculated location information;

wherein upon receiving a request from a user for a place registration, location information corresponding to the location of the mobile communication terminal is compared with the stored location information of the mobile communication terminal, and the control unit stores set points of the plurality of items in the user menu selected by the user corresponding to the location of the mobile communication terminal if the location information does not match with the stored location information, and the control unit notifies that the location of the mobile communication terminal is previously registered and displays settings of the plurality of items in the user menu corresponding to the location of the mobile communication terminal for editing if the location information matches with the stored location information; and wherein the plurality of items in the user menu include at least two items selected from the group consisting of a type of bell sound, a level of bell sound, screen brightness, a local area code, a restriction mode for incoming/outgoing calls, a manner mode, a background image, a restriction mode for incoming/outgoing SMS, a two-number service, a locking mode, and an alarm sound.

2. The mobile communication terminal as claimed in claim 1, wherein the location information of the mobile communication terminal comprises latitude and longitude coordinate values of the mobile communication terminal.

3. A method for varying settings of a plurality of items in a user menu of a mobile communication terminal according to a location of the mobile communication terminal, the method comprising the steps of:

calculating location information of the mobile communication terminal and storing the location information in a place information storing unit;

receiving and storing, in a setting information storing unit, the settings of the plurality of items in the user menu corresponding to the locations;

determining whether one of the places corresponds to the calculated location information; and varying, using a control unit, previous settings of the plurality of items in the user menu with predetermined settings of the items corresponding to the location of the mobile communication terminal when one of the places corresponds to the calculated location information, wherein upon receiving a request from a user for a place registration, location information corresponding to the location of the mobile communication terminal is compared with the stored location information of the mobile communication terminal, and the control unit stores set points of the plurality of items in the user menu selected by the user corresponding to the location of the mobile communication terminal if the location information does not match the stored location information, and the control unit notifies that the location of the mobile communication terminal is previously registered and displays settings of the plurality of items in the user menu corresponding to the location of the mobile communication terminal for editing if the location information matches with the stored location information;

wherein the plurality of items in the user menu include at least two items selected from the group consisting of a type of bell sound, a level of bell sound, screen brightness, a local area code, a restriction mode for incoming/outgoing calls, a manner modem a background image, a restriction mode for incoming/outgoing SMS, a two-number service, a locking mode, and an alarm sound.

4. A method for varying settings of a plurality of items in a user menu of a mobile communication terminal according to a location of the mobile communication terminal, the method comprising the steps of:

i) calculating location information of the mobile communication terminal by using a GPS signal and storing the calculated location information and places corresponding to the location information in an information storing unit;

ii) storing, in a setting information storing unit, the settings of the plurality of items in the user menu corresponding to the places;

iii) determining whether one of the places corresponds to the calculated location information; and iv) varying previous settings of the plurality of items in the user menu with predetermined settings of the items corresponding to the location of the mobile communication terminal when one of the places corresponds to the calculated location information, wherein upon receiving a request from a user for a place registration, location information corresponding to the location of the mobile communication terminal is compared with the stored location information of the mobile communication terminal, and a control unit stores set points of the plurality of items in the user menu selected by the user corresponding to the location of the mobile communication terminal if the location information does not match the stored location information, and the control unit notifies that the location of the mobile communication terminal is previously registered and displays settings of the plurality of items in the user menu corresponding to the location of the mobile communication terminal for editing if the location information matches with the stored location information;

wherein the plurality of items in the user menu include at least two items selected from the group consisting of a bell sound type, a level of bell sound, screen brightness, a local area code, a restriction mode for incoming/outgoing calls, a manner mode, a background image, a restriction mode for incoming/outgoing SMS, a two-number service, a locking mode, and an alarm sound.

5. A method for varying settings of a plurality of items in a user menu of a mobile communication terminal according to a location of the mobile communication terminal, the method comprising the steps of:

i) calculating location information of the mobile communication terminal by using a GPS signal and storing the calculated location information and places corresponding to the location information in an information storing unit;

ii) storing, in a setting information storing unit, the settings of the plurality of items in the user menu corresponding to the places;

iii) determining the location of the mobile communication terminal from the location information; and iv) varying previous settings of the plurality of items in the user menu with predetermined settings of the items corresponding to the location of the mobile communication terminal when the mobile communication terminal is located in a registered place, wherein upon receiving a request from a user for a place registration, location information corresponding to the location of the mobile communication terminal is compared with the stored location information of the mobile communication terminal, and a control unit stores set points of the plurality of items in the user menu selected by the user corresponding to the location of the mobile communication terminal.

6. A mobile communication terminal capable of varying settings of a plurality of items in a user menu depending on a location the mobile terminal, the mobile communication terminal comprising:

a GPS signal receiving unit for receiving a GPS signal;

a setting information storing unit for storing the settings of the plurality of items in the user menu corresponding to a plurality of places;

a places information storing unit for storing location information of the mobile communication terminal and places corresponding to the location information; and a control unit for calculating the location information of the mobile communication terminal by using the GPS signal received in the GPS signal receiving unit, determining whether one of the plurality of places corresponds to the calculated location information, and changing previous settings of the plurality of items in the user menu to predetermined settings of the plurality of items in the user menu corresponding to one of the plurality of places when the calculated location information corresponds to one of the plurality of places;

wherein upon receiving a request from a user for a place registration:

the calculated location information is compared with the stored location information of the mobile communication terminal, when the calculated location information does not match the stored location information, the control unit stores set points of the plurality of items in the user menu selected by the user for correspondence with a place of the calculated location information, and when the calculated location information matches the stored location information, the control unit provides a notification that the calculated location information was previously registered as a place and displays, for editing, settings of the plurality of items in the user menu corresponding to a place of the calculated location information; and wherein the plurality of items in the user menu incitide at least two items selected from the group consisting of a type of bell sound, a level of bell sound, screen brightness, a local area code, a restriction mode for incoming/outgoing calls, a manner mode, a background image, a restriction mode for incoming/outgoing SMS, a two-number service, a locking mode, and an alarm sound.

7. A method for varying settings of a plurality of items in a user menu of a mobile communication terminal according to a location of the mobile communication terminal, the method comprising the steps of:

calculating location information of the mobile communication terminal and storing the location information in a place information storing unit;

receiving and storing, in a setting information storing unit, the settings of the plurality of items in the user menu corresponding to a plurality of places;

determining whether one of the plurality of places corresponds to the calculated location information; and changing, using a control unit, previous settings of the plurality of items in the user menu to predetermined settings of the plurality of items in the user menu corresponding to one of the plurality of places, when one of the plurality of places corresponds to the calculated location information, wherein upon receiving a request from a user for a place registration:

the calculated location information is compared with the stored location information of the mobile communication terminal, w hen the calculated location information does not match the stored location information, the control unit stores set points of the plurality of items in the user menu selected by the user for correspondence with a place of the calculated location information, and when the calculated location information matches the stored location information, the control unit provides a notification that the calculated location information was previously registered as a place and displays, for editing, settings of the plurality of items in the user menu corresponding to a place of the calculated location information; and wherein the plurality of items in the user menu include at least two items selected from the group consisting of a type of bell sound, a level of bell sound, screen brightness, a local area code, a restriction mode for incoming/outgoing calls, a manner mode, a background image, a restriction mode for incoming/outgoing SMS, a two-number service, a locking mode, and an alarm sound.

* * * * *